UNITED STATES PATENT OFFICE.

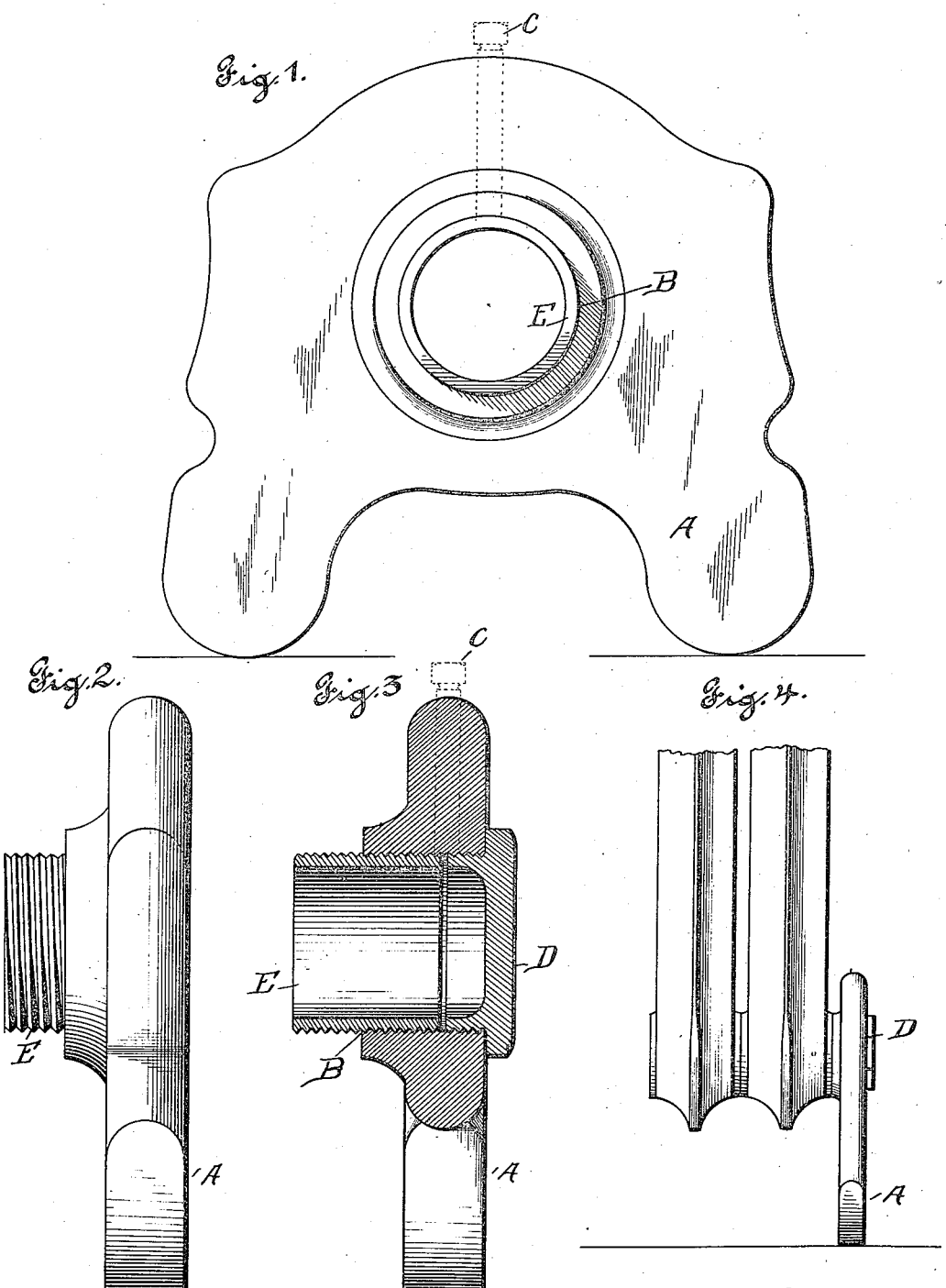

GEORGE W. DE STAEBLER, OF ST. LOUIS, MISSOURI.

DETACHABLE LEG FOR STEAM-COILS OR THE LIKE.

SPECIFICATION forming part of Letters Patent No. 723,655, dated March 24, 1903.

Application filed December 29, 1902. Serial No. 136,952. (No model.)

*To all whom it may concern:*

Be it known that I, GEORGE W. DE STAEBLER, of the city of St. Louis, State of Missouri, have invented certain new and useful Improvements in Detachable Legs for Steam-Coils or the Like, of which the following is a full, clear, and exact description, reference being had to the accompanying drawings, forming a part hereof.

My invention relates to improvements in detachable legs for steam-coils or the like, and has for its object to provide a leg for steam heating-coils or water heating-coils and the like which shall be readily removable for the purpose of replacing or repair of the parts.

In the drawings which form a part of the specification, Figure 1 is an end view of a device embodied in my invention. Fig. 2 is a side view of the same. Fig. 3 is a transverse vertical mid-section of the same. Fig. 4 is a side view of a portion of a radiator to which my device is applied, showing the same in position.

I have provided the leg-body A, having the threaded opening B. The leg-body A is of the form shown in the end view in Fig. 1 and is adapted to serve as a support for a steam heating-coil or a water heating-coil and is to be used in series of two or more upon each coil when the leg-body A is used upon the end of the coil to which steam or hot water is admitted. The inlet-pipe is screwed directly through the opening B. In order to secure perfect rigidity of the leg and the pipe passing through it, I have provided the screw C, which is seated through the upper flange of the leg-body A and whose lower end impinges upon the upper surface of the pipe, as shown by the dotted lines in Figs. 1 and 3. When the leg is to be used at the end of the coil opposite to that at which the steam or hot water is admitted, I have provided the plug D, which is to be screwed into position, as indicated in section in Fig. 3. The pipe E is then screwed into the opening B, and the set-screw C is tightened until it impinges upon the edges of the plug D and the pipe E.

Having thus described my invention, what I claim as new, and desire to have secured to me by grant of Letters Patent, is—

A detachable leg for steam-coils or the like provided with a transverse opening to receive the steam-pipe, a plug whereby the opening may be closed on one side, and a set-screw extending from the outer edge of the leg-body to the transverse opening, and adapted to impinge upon and hold in position the pipe and the plug in the transverse opening, substantially as and for the purpose as specified.

In testimony whereof I affix my signature in presence of two witnesses.

GEORGE W. DE STAEBLER.

Witnesses:
M. G. IRION,
ALFRED A. EICKS.